(12) United States Patent
Xie et al.

(10) Patent No.: US 9,643,855 B2
(45) Date of Patent: May 9, 2017

(54) SYNTHESIS OF ALUMINOSILICATE RTH FRAMEWORK TYPE ZEOLITES

(71) Applicant: Chevron U.S.A Inc., San Ramon, CA (US)

(72) Inventors: Dan Xie, Richmond, CA (US); Christopher Michael Lew, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 15/231,960

(22) Filed: Aug. 9, 2016

(65) Prior Publication Data

US 2017/0050858 A1    Feb. 23, 2017

Related U.S. Application Data

(60) Provisional application No. 62/207,448, filed on Aug. 20, 2015.

(51) Int. Cl.
*C01B 39/48* (2006.01)
*B01J 29/70* (2006.01)
*B01J 37/00* (2006.01)

(52) U.S. Cl.
CPC .............. *C01B 39/48* (2013.01); *B01J 29/70* (2013.01); *B01J 37/0018* (2013.01); *C01P 2002/72* (2013.01)

(58) Field of Classification Search
CPC ................................ C01B 39/48; B01J 29/70
See application file for complete search history.

(56) References Cited

U.S. PATENT DOCUMENTS

| | | | |
|---|---|---|---|
| 5,614,166 | A | 3/1997 | Gies et al. |
| 5,958,370 | A | 9/1999 | Zones et al. |
| 5,965,104 | A | 10/1999 | Lee et al. |
| 6,605,267 | B1 | 8/2003 | Lee et al. |
| 2004/0209759 | A1 | 10/2004 | Harbuzaru et al. |
| 2015/0202612 | A1 | 7/2015 | Schmidt et al. |

FOREIGN PATENT DOCUMENTS

JP    2010150128    7/2010

OTHER PUBLICATIONS

Piccone et al, "Thermodynamics of Pure-Silica Molecular Sieve Synthesis", J. Phys. Chem. B, (2002), pp. 3629-3638.*
S. Vortmann, B. Marler, H. Gies and P. Daniels "Synthesis and crystal structure of the new borosilicate zeolite RUB-13" Micropor. Mesopor. Mater. 1995, 4, 111-121.
Y. Nakagawa, G.S. Lee, T.V. Harris, L.T. Yuen and S.I. Zones "Guest/host relationships in zeolite synthesis: ring-substituted piperidines and the remarkable adamantane mimicry by 1-azonio spiro [5.5] undecanes" Micropor. Mesopor. Mater. 1998, 22, 69-85.

(Continued)

*Primary Examiner* — David M Brunsman
(74) *Attorney, Agent, or Firm* — Terrence M. Flaherty

(57) ABSTRACT

A method of making aluminosilicate RTH framework type zeolites is disclosed using 2,6-dimethyl-1-aza-spiro[5.4]decane cations as a structure directing agent.

8 Claims, 2 Drawing Sheets

(56) References Cited

OTHER PUBLICATIONS

P. Wagner, Y. Nakagawa, G.S. Lee, M.E. Davis, S. Elomari, R.C. Medrud and S.I. Zones "Guest/Host Relationships in the Synthesis of the Novel Cage-Based Zeolites SSZ-35, SSZ-36, and SSZ-39" J. Am. Chem. Soc. 2000, 122, 263-273.
G.S. Lee and S.I. Zones "Polymethylated [4.1.1] Octanes Leading to Zeolite SSZ-50" J. Solid State Chem. 2002, 167, 289-298.
T. Yokoi, M. Yoshioka, H. Imai and T. Tatsumi "Diversification of RTH-Type Zeolite and Its Catalytic Application" Angew. Chem Int. Ed. 2009, 48, 9884-9887.
J.E. Schmidt, M.A. Deimund and M.E. Davis "Facile Preparation of Aluminosilicate RTH across a Wide Composition Range Using a New Organic Structure-Directing Agent" Chem. Mater. 2014, 26, 7099-7105.
J.E. Schmidt, M.A. Deimund, D. Xie and M.E. Davis "Synthesis of RTH-Type Zeolites Using a Diverse Library of Imidazolium Cations" Chem. Mater. 2015, 27, 3756-3762.
International Search Report, International Appl. No. PCT/US2016/046138, mailed Nov. 17, 2016.

\* cited by examiner

SYNTHESIS OF ALUMINOSILICATE RTH FRAMEWORK TYPE ZEOLITES

TECHNICAL FIELD

This disclosure relates generally to a method for preparing aluminosilicate RTH framework type zeolites using 2,6-dimethyl-1-aza-spiro[5.4]decane cations as a structure directing agent.

BACKGROUND

Molecular sieves are a commercially important class of crystalline materials. They have distinct crystal structures with ordered pore structures which are demonstrated by distinct X-ray diffraction patterns. The crystal structure defines cavities and pores which are characteristic of the different species. Molecular sieves such as zeolites have been used extensively to catalyze a number of chemical reactions in refinery and petrochemical reactions, and catalysis, adsorption, separation, and chromatography.

One known molecular sieve for which a structure has been established is the material designated as RTH, which is a molecular sieve characterized by a two-dimensional pore system of intersecting 8-membered ring (8-MR) channels, leading to larger cages. Due to its unique structure, RTH framework type zeolites are of significant interest as catalysts for methanol-to-olefins (MTO) conversion and $NO_x$ reduction. Examples of RTH framework type materials include RUB-13 and SSZ-50.

S. Vortmann et al. (*Micropor. Mesopor. Mater.* 1995, 4, 111-121) disclose borosilicate zeolite RUB-13 and its synthesis using 1,2,2,6,6-pentamethylpiperidine and ethylenediamine as structure directing agents. Borosilicate zeolites, however, are not sufficiently catalytically active to be practicable for processes such as MTO conversion and $NO_x$ reduction.

U.S. Pat. No. 6,605,267 discloses aluminosilicate zeolite SSZ-50 and its synthesis using an N-ethyl-N-methyl-5,7,7-trimethyl-2-azonium bicyclo[4.1.1]octane cation as a structure directing agent.

The commercial development of SSZ-50 has been hindered by the high cost of the structure directing agent required for its synthesis and hence there is significant interest in finding alternative, less expensive means for the synthesis of aluminosilicate RTH framework type zeolites.

It has now been found that aluminosilicate RTH framework type zeolites can be prepared using 2,6-dimethyl-1-aza-spiro[5.4]decane cations as a structure directing agent.

SUMMARY

In one aspect, there is provided a method of preparing an aluminosilicate RTH framework type zeolite by contacting under crystallization conditions (1) at least one source of silicon oxide; (2) at least one source of aluminum oxide; (3) at least one source of an element selected from Groups 1 and 2 of the Periodic Table; (4) 2,6-dimethyl-1-aza-spiro[5.4] decane cations; and (5) hydroxide ions.

In another aspect, there is provided a process for preparing an aluminosilicate RTH framework type zeolite by: (a) preparing a reaction mixture containing: (1) at least one source of silicon oxide; (2) at least one source of aluminum oxide; (3) at least one source of an element selected from Groups 1 and 2 of the Periodic Table; (4) 2,6-dimethyl-1-aza-spiro[5.4]decane cations; (5) hydroxide ions; and (6) water; and (b) subjecting the reaction mixture to crystallization conditions sufficient to form crystals of the zeolite.

In one aspect, there is provided an aluminosilicate RTH framework type zeolite containing 2,6-dimethyl-1-aza-spiro[5.4]decane cations within its pore structure.

In another aspect, there is provided an aluminosilicate RTH framework type zeolite having a composition, as-synthesized and in the anhydrous state, in terms of mole ratios, as follows:

|  | Broad | Exemplary |
| --- | --- | --- |
| $SiO_2/Al_2O_3$ | 10 to 40 | 15 to 25 |
| $Q/SiO_2$ | 0.02 to 0.20 | 0.05 to 0.20 |
| $M/SiO_2$ | 0.01 to 0.20 | 0.02 to 0.15 | wherein Q represents 2,6-dimethyl-1-aza-spiro[5.4]decane cations and M is selected from the group consisting of elements from Groups 1 and 2 of the Periodic Table.

DETAILED DESCRIPTION

Introduction

Figure 1:
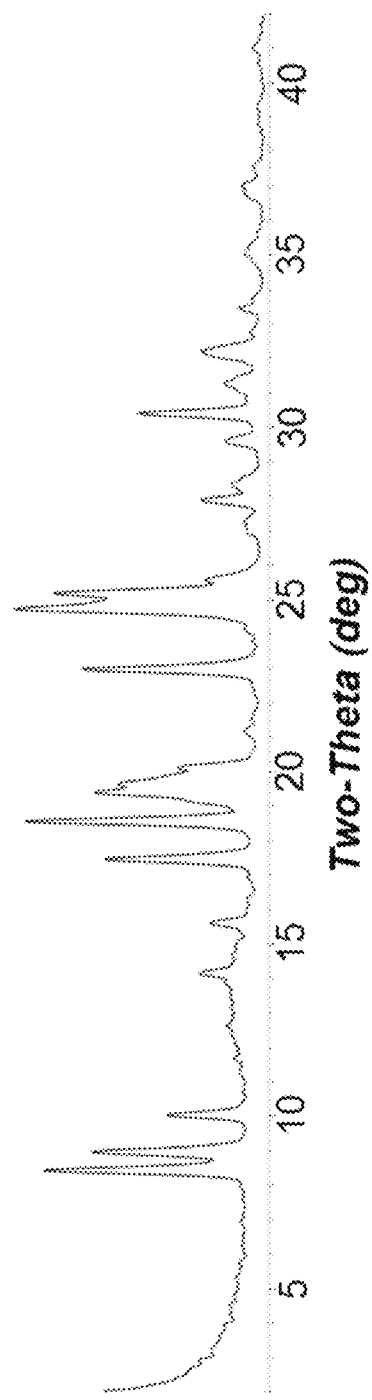
FIG. 1 is a powder X-ray diffraction (XRD) pattern of the as-synthesized zeolite prepared in Example 1.

The following terms will be used throughout the specification and will have the following meanings unless otherwise indicated.

The term "framework type" is used in the sense described in the "*Atlas of Zeolite Framework Types,*" Sixth Revised Edition, Elsevier, 2007.

As used herein, the numbering scheme for the Periodic Table Groups is as disclosed in *Chem. Eng. News,* 1985, 63(5), 26-27.

In preparing aluminosilicate RTH framework type zeolites, a 2,6-dimethyl-1-aza-spiro[5.4]decane cation is used as a structure directing agent ("SDA"), also known as a crystallization template. The SDA useful for making RTH framework type zeolites is represented by the following structure (1):

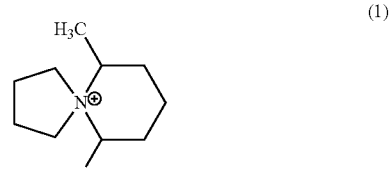

2,6-dimethyl-1-aza-spiro[5.4] decane cation

The SDA cation is associated with anions which can be any anion that is not detrimental to the formation of the zeolite. Representative anions include elements from Group 17 of the Periodic Table (e.g., fluoride, chloride, bromide, and iodide), hydroxide, sulfate, tetrafluoroborate, acetate, carboxylate, and the like.

Reaction Mixture

In general, the aluminosilicate RTH framework type zeolite is prepared by: (a) preparing a reaction mixture containing (1) at least one source of silicon oxide; (2) at least one source of aluminum oxide; (3) at least one source of an element selected from Groups 1 and 2 of the Periodic Table; (4) 2,6-dimethyl-1-aza-spiro[5.4]decane cations; (5) hydroxide ions; and (6) water; and (b) subjecting the reaction mixture to crystallization conditions sufficient to form crystals of the zeolite.

The composition of the reaction mixture from which the zeolite is formed, in terms of mole ratios, is identified in Table 1 below:

TABLE 1

|  | Broad | Exemplary |
| --- | --- | --- |
| $SiO_2/Al_2O_3$ | 10 to 80 | 30 to 60 |
| $M/SiO_2$ | 0.05 to 0.40 | 0.05 to 0.25 |
| $Q/SiO_2$ | 0.10 to 0.40 | 0.10 to 0.25 |
| $OH/SiO_2$ | 0.20 to 1.00 | 0.20 to 0.60 |
| $H_2O/SiO_2$ | 10 to 50 | 15 to 30 | wherein compositional variables M and Q are as defined herein above.

Suitable sources of silicon oxide include fumed silica, precipitated silicates, silica hydrogel, silicic acid, colloidal silica, tetra-alkyl orthosilicates, and silica hydroxides.

Suitable sources of aluminum oxide include hydrated alumina, aluminum hydroxide, alkali metal aluminates, aluminum alkoxides, water-soluble aluminum salts such as aluminum nitrate, kaolin clays, and other zeolites. An example of the source of aluminum is zeolite Y.

As described herein above, for each embodiment described herein, the reaction mixture can be formed using at least one source of an element selected from Groups 1 and 2 of the Periodic Table of Elements (referred to herein as M). In one sub-embodiment, the reaction mixture is formed using a source of an element from Group 1 of the Periodic Table. In another sub-embodiment, the reaction mixture is formed using a source of sodium (Na). Any M-containing compound which is not detrimental to the crystallization process is suitable. Sources for such Groups 1 and 2 elements include oxides, hydroxides, nitrates, sulfates, halides, acetates, oxalates and citrates thereof.

Optionally, the reaction mixture may contain seed crystals. In one embodiment, synthesis of the crystalline zeolite is facilitated by the presence of 0.05 to 10.0 wt. % (e.g., from 1 to 5 wt. %) seed crystals based on the total weight of the reaction mixture. The seed crystals can be isostructural with the desired zeolite, for example, the product of a previous synthesis.

For each embodiment described herein, the reaction mixture can be supplied by more than one source. Also, two or more reaction components can be provided by one source.

The reaction mixture can be prepared either batch wise or continuously. Crystal size, morphology and crystallization time of the crystalline zeolite described herein can vary with the nature of the reaction mixture and the crystallization conditions.

Crystallization and Post-Synthesis Treatment

Crystallization of the zeolite can be carried out under either static, tumbled or stirred conditions in a suitable reactor vessel, such as for example polypropylene jars or Teflon-lined or stainless steel autoclaves, at a temperature of from 125° C. to 200° C. for a time sufficient for crystallization to occur at the temperature used, e.g., from 1 day to 28 days.

Once the zeolite crystals have formed, the solid product is separated from the reaction mixture by standard mechanical separation techniques such as centrifugation or filtration. The crystals are water-washed and then dried to obtain the as-synthesized zeolite crystals. The drying step is typically performed at a temperature of less than 200° C.

As a result of the crystallization process, the recovered crystalline zeolite product contains within its pore structure at least a portion of the structure directing agent used in the synthesis.

The organic structure directing agent is typically at least partially removed from the zeolite by calcination before use. Calcination consists essentially of heating the zeolite comprising the structure directing agent at a temperature of from 200° C. to 800° C. in the presence of an oxygen-containing gas, optionally in the presence of steam. The organic structure directing agent can also be removed by photolysis techniques as described in U.S. Pat. No. 6,960,327.

To the extent desired and depending on the composition of the zeolite, any cations in the as-synthesized or calcined zeolite can be replaced in accordance with techniques well known in the art by ion exchange with other cations. Preferred replacing cations include metal ions, hydrogen ions, hydrogen precursor, e.g., ammonium ions and mixtures thereof. Particularly preferred cations are those which tailor the catalytic activity for certain hydrocarbon conversion reactions. These include hydrogen, rare earth metals and metals of Groups 2 to 15 of the Periodic Table of the Elements. As used herein, the term "as-synthesized" refers to the zeolite in its form after crystallization, prior to removal of the SDA cation.

The zeolite disclosed herein can be formulated with into a catalyst composition by combination with other materials, such as binders and/or matrix materials, which provide additional hardness or catalytic activity to the finished catalyst.

Characterization of the Zeolite

Aluminosilicate RTH framework type zeolites made by the process disclosed herein have a composition, as-synthesized and in the anhydrous state, in terms of mole ratios, as described in Table 2 below:

TABLE 2

|  | Broad | Exemplary |
| --- | --- | --- |
| $SiO_2/Al_2O_3$ | 10 to 40 | 15 to 25 |
| $Q/SiO_2$ | 0.02 to 0.20 | 0.05 to 0.20 |
| $M/SiO_2$ | 0.01 to 0.20 | 0.02 to 0.15 | wherein compositional variables Q and M are as defined herein above.

It should be noted that the as-synthesized form of the RTH framework type zeolite may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

The RTH framework type zeolites synthesized by the process described herein are characterized by their X-ray diffraction pattern. X-ray diffraction patterns representative of RTH framework type zeolites can be referenced in the "*Collection of Simulated XRD Powder Patterns for Zeo-* lites," Fifth Revised Edition, Elsevier, 2007. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can result from variations in the organic compound used in the preparation. Calcination can also cause minor shifts in the X-ray diffraction pattern. Notwithstanding these minor pertubations, the basic crystal structure remains unchanged.

The powder X-ray diffraction patterns presented herein were collected by standard techniques. The radiation was CuK$_\alpha$ radiation. The peak heights and the positions, as a function of 2θ where θ is the Bragg angle, were read from the relative intensities of the peaks, and d, the interplanar spacing corresponding to the recorded lines, can be calculated.

EXAMPLES

The following illustrative examples are intended to be non-limiting.

Example 1

0.10 g of a 50% NaOH solution, 0.74 g of deionized water and 3.06 g of a 7.32% 2,6-dimethyl-1-aza-spiro[5.4]decane hydroxide solution were mixed together in a Teflon liner. Then, 0.30 g of CBV760 Y-zeolite (Zeolyst International, $SiO_2/Al_2O_3$ mole ratio=60) and 0.20 g of CBV720 Y-zeolite (Zeolyst International, $SiO_2/Al_2O_3$ mole ratio=30) were added to the mixture. The resulting gel was stirred until it became homogeneous. The liner was capped and placed within a Parr steel autoclave reactor. The autoclave was placed in an oven and heated at 150° C. for 5 days. The solid products were recovered from the cooled reactor by centrifugation, washed with deionized water and dried at 95° C.

Figure 2:
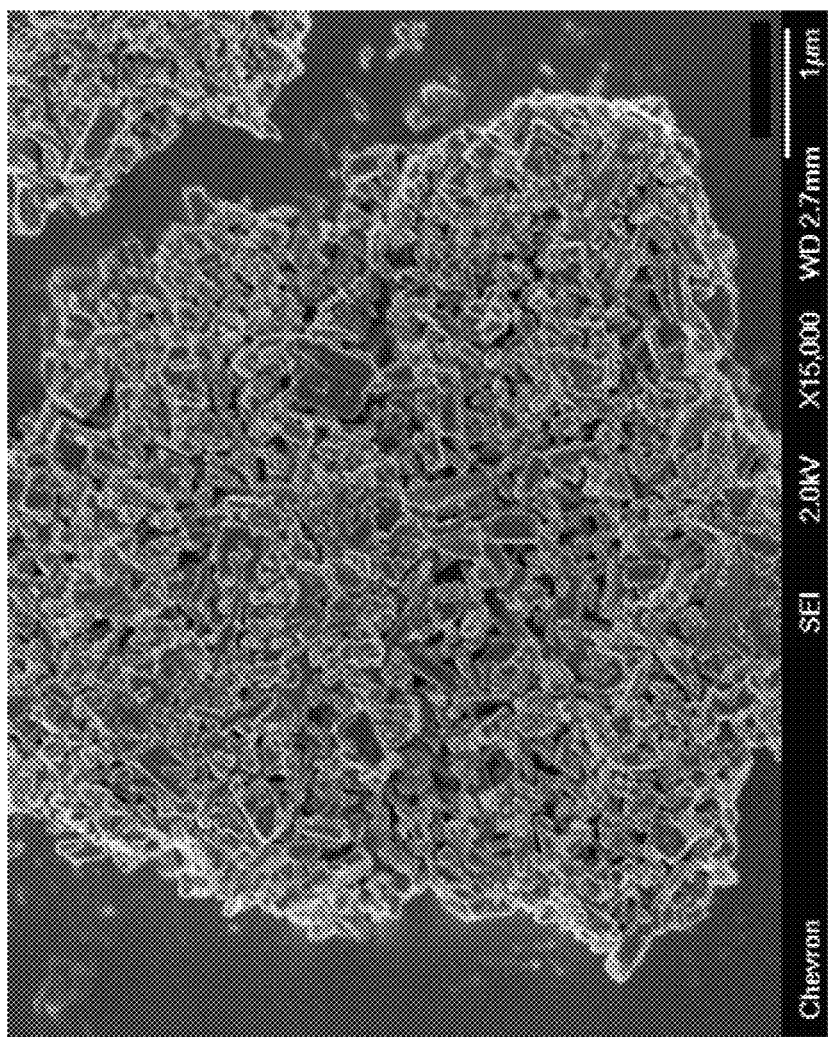
FIG. 2 is a Scanning Electron Micrograph (SEM) image of the as-synthesized zeolite prepared in Example 1.

The resulting product was analyzed by powder XRD and SEM. The powder XRD pattern is shown in FIG. 1 and indicates that the material is a pure RTH framework type zeolite. The SEM image is shown in FIG. 2 and indicates a uniform field of crystals.

The product had a $SiO_2/Al_2O_3$ mole ratio of 17.8, as determined by ICP elemental analysis.

Example 2

0.19 g of a 50% NaOH solution and 8.16 g of a 7.32% 2,6-dimethyl-1-aza-spiro[5.4]decane hydroxide solution were mixed together in a Teflon liner. Then, 1.00 g of CBV760 Y-zeolite (Zeolyst International, $SiO_2/Al_2O_3$ mole ratio=60) and 0.20g of RTH zeolite seeds were added to the mixture. The resulting gel was stirred until it became homogeneous. The liner was capped and placed within a Parr steel autoclave reactor. The autoclave was placed in an oven and heated at 150° C. for 4 days. The solid products were recovered from the cooled reactor by centrifugation, washed with deionized water and dried at 95° C.

The resulting product was identified by powder XRD and SEM to be pure RTH framework type zeolite.

The product had a $SiO_2/Al_2O_3$ mole ratio of 18.9, as determined by ICP elemental analysis.

Example 3

0.39 g of a 50% NaOH solution, 2.96 g of deionized water and 12.23 g of a 7.32% 2,6-dimethyl-1-aza-spiro[5.4]decane hydroxide solution were mixed together in a Teflon liner. Then, 2.00 g of CBV780 Y-zeolite (Zeolyst International, $SiO_2/Al_2O_3$ mole ratio=80) and 0.20g of RTH zeolite seeds were added to the mixture. The resulting gel was stirred until it became homogeneous. The liner was capped and placed within a Parr steel autoclave reactor. The autoclave was placed in an oven and heated at 150° C. for 4 days. The solid products were recovered from the cooled reactor by centrifugation, washed with deionized water and dried at 95° C.

The resulting product was identified by powder XRD and SEM to be pure RTH framework type zeolite.

The product had a $SiO_2/Al_2O_3$ mole ratio of 19.6, as determined by ICP elemental analysis.

Example 4

0.21 g of a 50% NaOH solution, 1.44 g of deionized water and 5.92 g of a 7.32% 2,6-dimethyl-1-aza-spiro[5.4]decane hydroxide solution were mixed together in a PPE bottle. Then, 1.00 g of CBV720 Y-zeolite (Zeolyst International, $SiO_2/Al_2O_3$ mole ratio=30) were added to the mixture. The resulting gel was stirred until it became homogeneous and was transferred to two Teflon liners. Each liner was capped and placed within a Parr steel autoclave reactor. The autoclave was placed in an oven and heated at 150° C., one liner for 5 days and the other liner for 9 days. The solid products were recovered from the cooled reactor by centrifugation, washed with deionized water and dried at 95° C.

The product obtained after heating for 5 days was identified by powder XRD to be a mixture of RTH framework type zeolite and unreacted FAU framework type precursor zeolites. The product obtained after 9 days was identified by powder XRD to be a mixture of RTH and AEI framework type zeolites.

Example 5

0.13 g of a 50% NaOH solution, 0.72 g of deionized water and 3.06 g of a 7.32% 2,6-dimethyl-1-aza-spiro[5.4]decane hydroxide solution were mixed together in a Teflon liner. Then, 0.50 g of CBV760 Y-zeolite (Zeolyst International, $SiO_2/Al_2O_3$ mole ratio=60) was added to the mixture. The resulting gel was stirred until it became homogeneous. The liner was capped and placed within a Parr steel autoclave reactor. The autoclave was placed in an oven and heated at 150° C. for 5 days. The solid products were recovered from the cooled reactor by centrifugation, washed with deionized water and dried at 95° C.

The resulting product was identified by powder XRD to be a mixture of RTH and STF framework type zeolites.

As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

All documents cited in this application are herein incorporated by reference in their entirety to the extent such disclosure is not inconsistent with this text.

The invention claimed is:

1. A method of preparing an aluminosilicate RTH framework type zeolite, comprising:
   (a) preparing a reaction mixture containing:
     (1) at least one source of silicon oxide;
     (2) at least one source of aluminum oxide;
     (3) at least one source of an element (M) selected from Groups 1 and 2 of the Periodic Table;
     (4) 2,6-dimethyl-1-aza-spiro[5.4]decane cations (Q);
     (5) hydroxide ions; and
     (6) water; and (b) subjecting the reaction mixture to crystallization condition sufficient to form crystals of the zeolite.

2. The method of claim 1, wherein the zeolite is prepared from a reaction mixture comprising, in terms of mole ratios, the following:

| | |
|---|---|
| $SiO_2/Al_2O_3$ | 10 to 80 |
| $M/SiO_2$ | 0.05 to 0.40 |
| $Q/SiO_2$ | 0.10 to 0.40 |
| $OH/SiO_2$ | 0.20 to 1.00 |
| $H_2O/SiO_2$ | 10 to 50 |

3. The method of claim 1, wherein the zeolite is prepared from a reaction comprising, in terms of mole ratios, the following:

| | |
|---|---|
| $SiO_2/Al_2O_3$ | 30 to 60 |
| $M/SiO_2$ | 0.05 to 0.25 |
| $Q/SiO_2$ | 0.10 to 0.25 |
| $OH/SiO_2$ | 0.20 to 0.60 |
| $H_2O/SiO_2$ | 15 to 30 |

4. The method of claim 1, wherein the zeolite has a composition, as-synthesized and in the anhydrous state, in terms of mole ratios, comprising the following:

| | |
|---|---|
| $SiO_2/Al_2O_3$ | 10 to 40 |
| $Q/SiO_2$ | 0.02 to 0.20 |
| $M/SiO_2$ | 0.01 to 0.20 |

5. The method of claim 1, wherein the zeolite has a composition, as-synthesized and in the anhydrous state, in terms of mole ratios, comprising the following:

| | |
|---|---|
| $SiO_2/Al_2O_3$ | 15 to 25 |
| $Q/SiO_2$ | 0.05 to 0.20 |
| $M/SiO_2$ | 0.02 to 0.15 |

6. An aluminosilicate RTH framework type zeolite comprising 2,6-dimethyl-1-aza-spiro[5.4]decane cations within in its pore structure.

7. The zeolite of claim 6, wherein the zeolite has a $SiO_2/Al_2O_3$ mole ratio of from 10 to 40.

8. The zeolite of claim 6, wherein the zeolite has a $SiO_2/Al_2O_3$ mole ratio of from 15 to 25.

* * * * *